United States Patent [19]

Dick et al.

[11] 4,016,951
[45] Apr. 12, 1977

[54] AIR TRANSPORTABLE SEISMIC EXPLORATION SYSTEM FOR USE ON ICE-COVERED WATERS

[75] Inventors: Charles W. Dick, Houston; Otis A. Johnston, League City; John L. Paitson, Galveston; Carl H. Savit, Houston, all of Tex.

[73] Assignee: Western Geophysical Company of America, Houston, Tex.

[22] Filed: Mar. 8, 1976

[21] Appl. No.: 664,502

[52] U.S. Cl. .............................. 181/109; 181/110; 181/113; 181/118; 181/120; 52/143
[51] Int. Cl.² .......................................... G01V 1/02
[58] Field of Search .......... 181/109, 110, 114, 122, 181/118, 120; 52/122, 143, 157; 280/8

Primary Examiner—Howard A. Birmiel
Attorney, Agent, or Firm—William L. LaFuze; William A. Knox

[57] ABSTRACT

A seismic exploration system for use on ice-covered waters is disclosed. The system comprises a housing which contains equipment such as an engine, a compressor, means for boring holes in the ice, and acoustic signal generating means that can be lowered into the water through holes in the ice. The housing is sufficiently lightweight that it easily can be transported from one location to another by helicopter or other aircraft. The heat generated by the engine is sufficient to provide a comfortable working environment for personnel within said housing and helps prevent freezing of equipment located within said housing.

18 Claims, 7 Drawing Figures

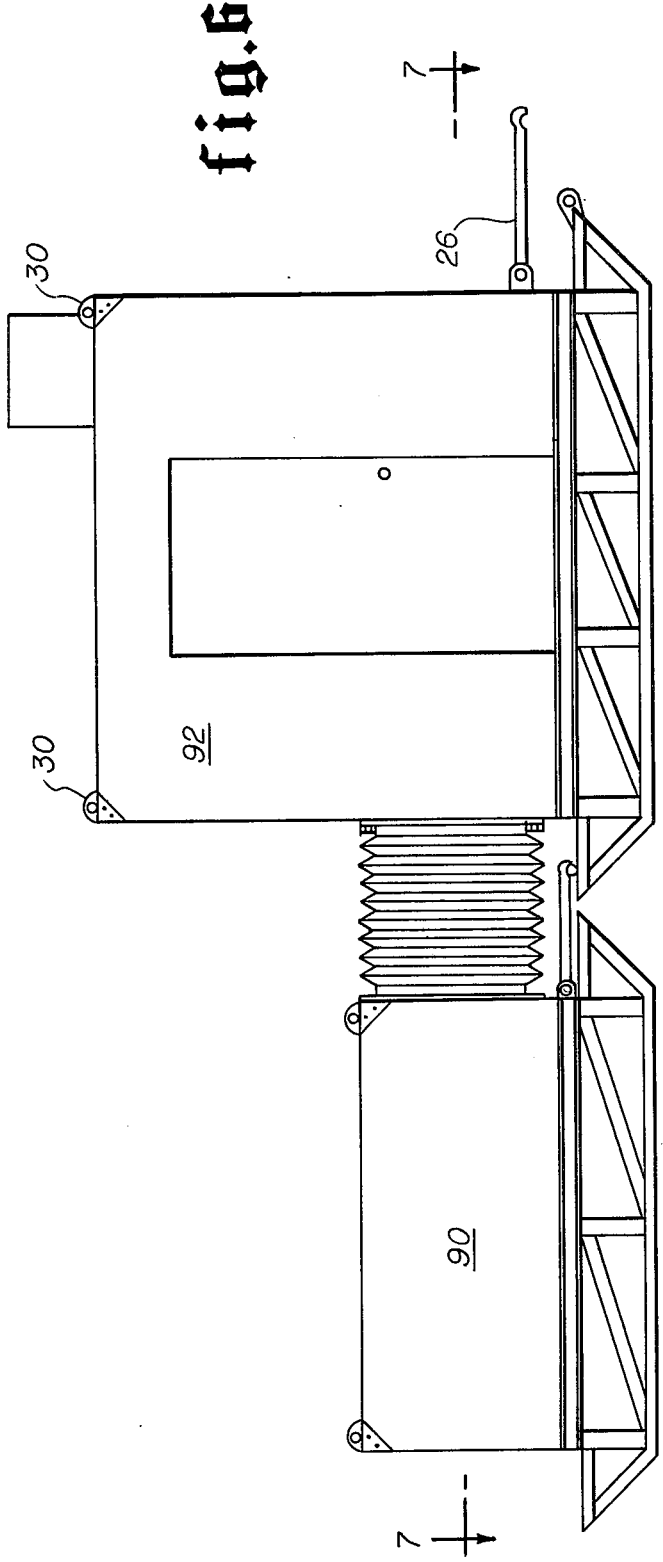
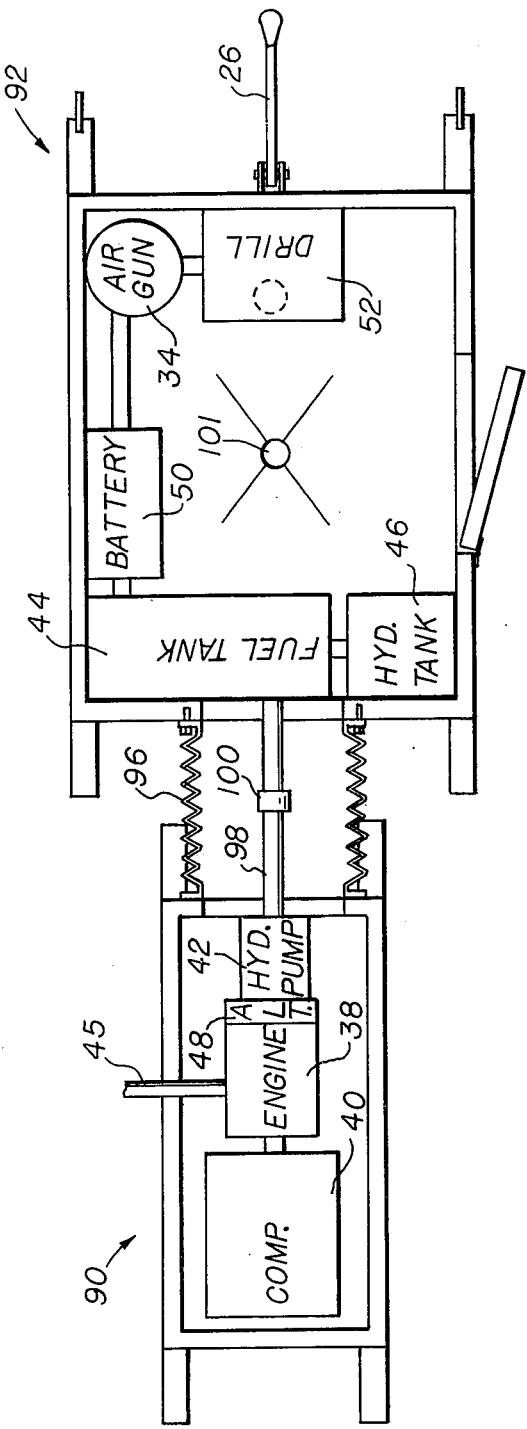

AIR TRANSPORTABLE SEISMIC EXPLORATION SYSTEM FOR USE ON ICE-COVERED WATERS

BACKGROUND OF THE INVENTION

This invention relates to seismic exploration systems, and more particularly, to air-transportable seismic exploration systems which are used on ice-covered waters.

In the prior art, seismic systems have been utilized for exploration in cold marine environments. One problem with these prior art systems is that they are so heavy that transporting such systems from one location to another by helicopter or other air means is not practical. Another problem arising from these heavy systems is that such systems must be supported by relatively thick layers of ice, thus limiting the areas and seasons in which use of such systems is practical. Still another problem is that prior art systems have not provided sufficiently warm working conditions for the protection of equipment and personnel without using auxiliary heating apparatus.

SUMMARY

Applicants solve the above problems associated with prior art systems by providing an insulated housing which contains certain seismic equipment and provides a working space for personnel. Such housing and associated equipment is sufficiently lightweight that it easily can be transported from one location to another by helicopter or other means. Further, heat is generated as a by-product of power means within said housing which provides a comfortable working environment for personnel therein and which tends to protect equipment therein from freezing. The system includes means for boring holes through said ice so that seismic apparatus may be lowered into the water near said housing for exploration purposes.

It is therefore an object of this invention to provide a lightweight seismic exploration system for use on ice-covered waters which easily is transportable from one location to another by helicopter or other suitable means and which is supportable by a minimum thickness of ice.

It is a further object to provide a housing for a seismic exploration system so that heat generated by required means to power said system within said housing tends to prevent freezing of the components of said system and warms the personnel working area.

BRIEF DESCRIPTION OF THE DRAWINGS

The foregoing and other objects, features, and advantages of the invention will be apparent from the following more particular description of embodiments of the invention as illustrated in the accompanying drawings in which:

FIG. 6 is an elevation view of an alternative embodiment of the invention wherein the housing comprises two sections.

FIG. 7 is a sectional view of the housing of FIG. 6 illustrating schematically certain of the components of the system.

DESCRIPTION OF THE PREFERRED EMBODIMENTS

Figure 1:
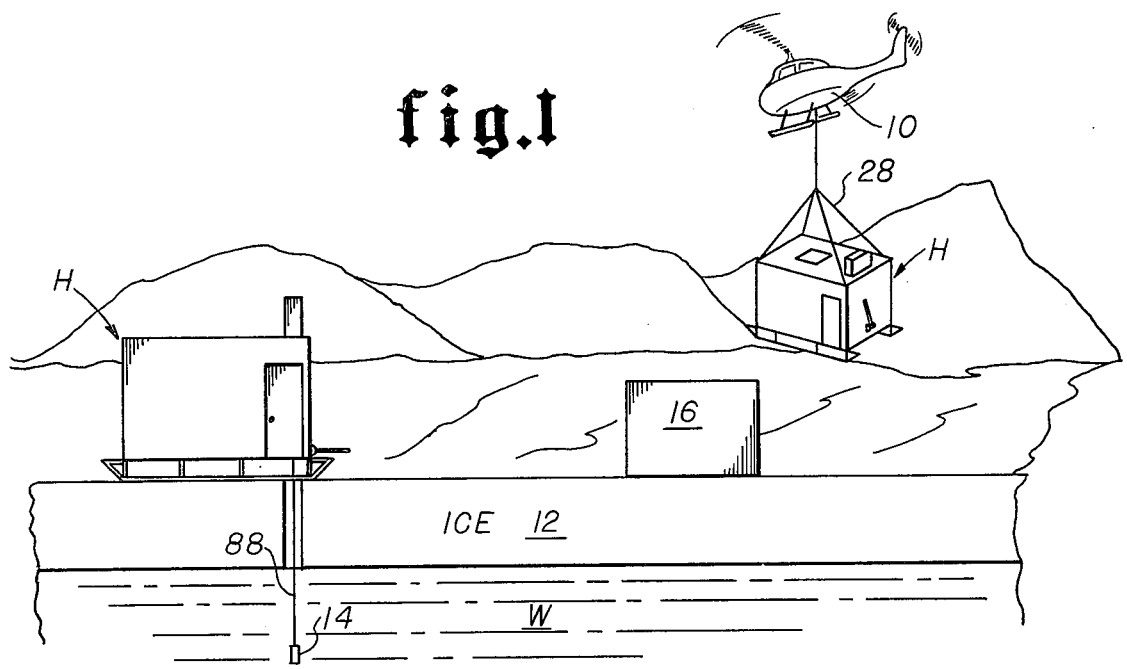
FIG. 1 is a schematic illustration of the seismic system, including the transportation of the housing of the system by a helicopter.

FIG. 1 illustrates schematically a seismic exploration system which can be utilized on ice-covered water. A housing H containing various seismic equipment is sufficiently small and lightweight that it can be transported by air transporting means such as helicopter 10 to any desired location on ice 12 which covers water W. After the housing H is placed in position, a drilling apparatus bores a hole through the ice 12 so that acoustic signal generating means such as an air gun can be lowered through the hole in the ice 12 and into the water W at the desired depth. The air gun is then detonated and standard sensing means associated with seismic shack 16 detect and record signals which are subsequently analyzed using various exploratory processing techniques.

The invention is described in more detail with respect to FIGS. 2, 3, 4, and 5.

Figure 2:
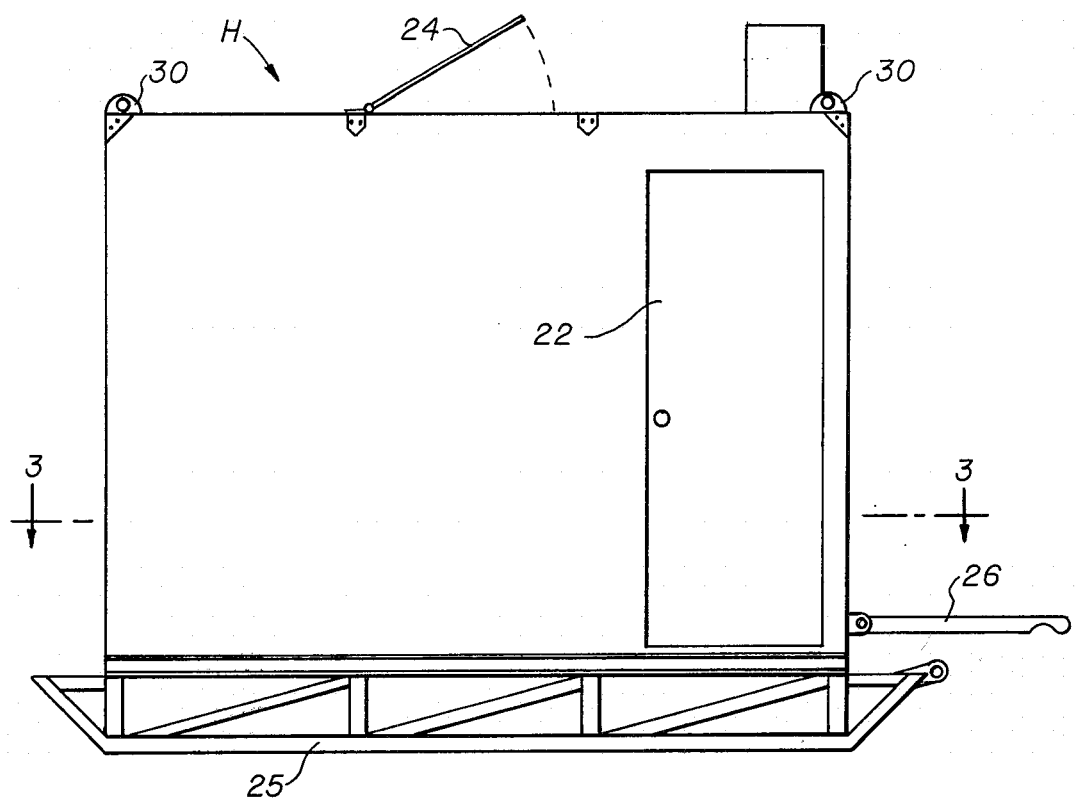
FIG. 2 is an elevation view of the housing of the seismic system.
Figure 3:
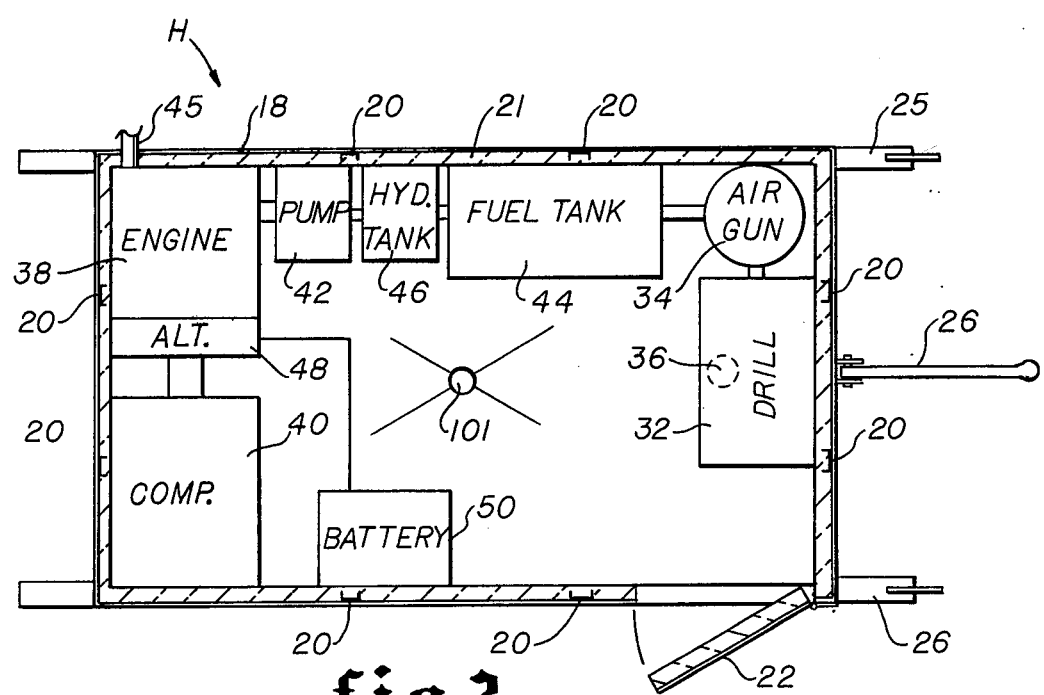
FIG. 3 is a schematic plan view, partially in section, of the housing showing the major components of the system.

As illustrated in FIGS. 2 and 3, the housing H is designed to contain the necessary seismic equipment and to provide operating space for personnel therein. Housing H is a substantially enclosed shelter which, in the preferred embodiment, is made of an aluminum skin 18 mounted on a sturdy aluminum skeleton 20. The inside of housing H is coated with several inches of insulation such as Styrofoam 21 to protect the personnel and equipment within housing H from the extremely cold environment. Housing H includes an entrance door 22 and an emergency escape hatch 24. The floor of housing H slopes downwardly towards a small hole so that fluids spilled on the housing floor will be carried outside of the housing. Housing H is mounted on skids 25 which provide a means for easily sliding the structure over ice 12 by exerting a horizontal force on tow bar 26. Referring to FIGS. 1 and 2, a means attached to said housing for connecting housing H to air-transportable means such as helicopter 10 is provided by a cable bridle 28 which is connected to attachment means 30 located on the four corners of the roof of the housing.

Preferably, the walls and ceiling of housing H are sprayed with 2 inches of Styrofoam while the floor is covered with 4 inch-thick preformed blocks of Styrofoam positioned between I-beams 23.

As shown in FIG. 3, housing H may contain various equipment depending on the specific method of exploration employed. In the preferred embodiment, two primary components are an ice auger drill 32 and an air gun 34. Drill 32 provides a means connected to housing H for boring holes in the ice 12 below housing H while air gun 14, which may be lowered through hole 36 in the floor of housing H, provides a means for generating acoustic signals in water W. A power means such as an air-cooled engine 38 is provided within housing H primarily to supply power for the equipment used with the system. For example, engine 38 drives an air compressor 40 which in turn provides compressed air through suitable connecting means to air gun 34. Engine 38 also drives a hydraulic pump 42 which supplies hydraulic power to a drive motor for drill 32 and to a motor which controls a hoist and pull-down mechanism for drill 32 which is described more fully hereinafter. Other components within housing H are a fuel tank 44 for containing a reservoir of fuel for engine 38, a hydraulic tank for containing a reservoir of fluid for pump 42, and an alternator 48 which is driven by engine 38 and, in association with other appropriate electrical apparatus, supplies direct current electricity to various electrical apparatus and to storage battery 50.

Air is supplied to the personnel and engine 38 within housing H through hole 36 in the floor of housing H and exhaust gases from engine 38 are vented through a pipe 45.

An important feature of this invention results from locating engine 38 and compressor 40 within housing H. Since engine 38 and compressor 40 are preferably air-cooled, a natural consequence of operating engine 38 and the associated equipment to supply hydraulic, compressed air, and electric power to other equipment within the system is that a substantial amount of heat is radiated within housing H. As a result, the personnel and equipment within housing H are provided with a relatively warm environment without having auxiliary heating equipment. This is particularly important with respect to air gun 34 which tends to become frozen easily. This invention is typically operated in temperatures ranging from −35° to −60° F. The volume of space within housing H, the amount of insulation used within housing H and the size of engine 38 are parameters which determine the temperature within housing H. In the preferred embodiment, the volume of housing H, the amoumt of insulation, and engine 38 and compressor 40 are selected to that the temperatures within housing H will be maintained within the range 35°–50° F. Also, these parameters are such that the inside of housing H will remain at temperatures above freezing for at least twenty minutes after engine 38 is turned off since engine 38 is stopped for such periods when housing H is transported from one location to another by air. Of course, the temperature within housing H can also be lowered if necessary by opening escape hatch 24.

Figure 4:
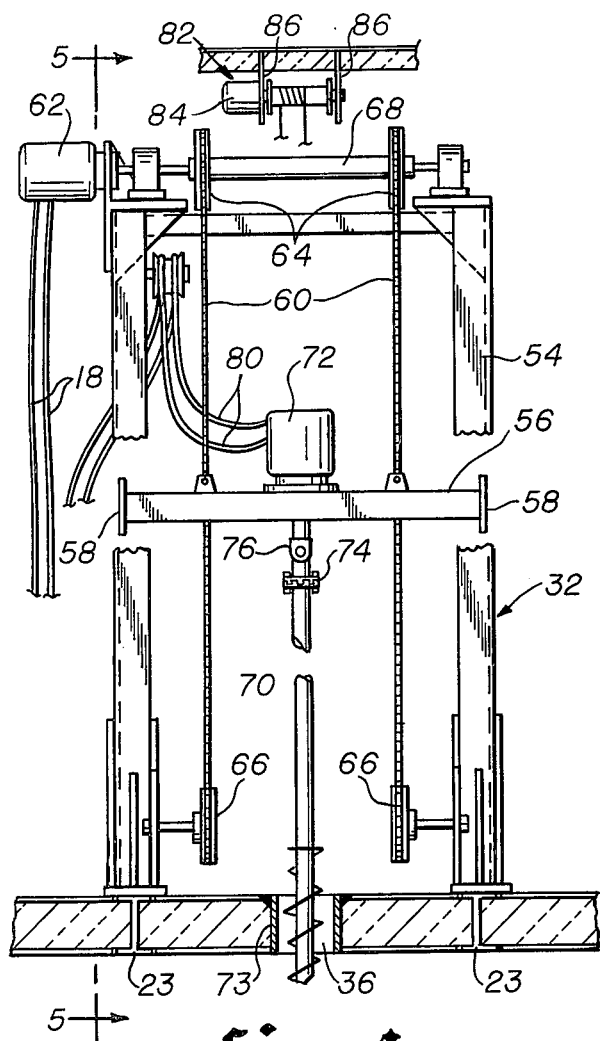
FIG. 4 is a view, partly in section and partly in elevation, of the drill and winch components of the invention.
Figure 5:
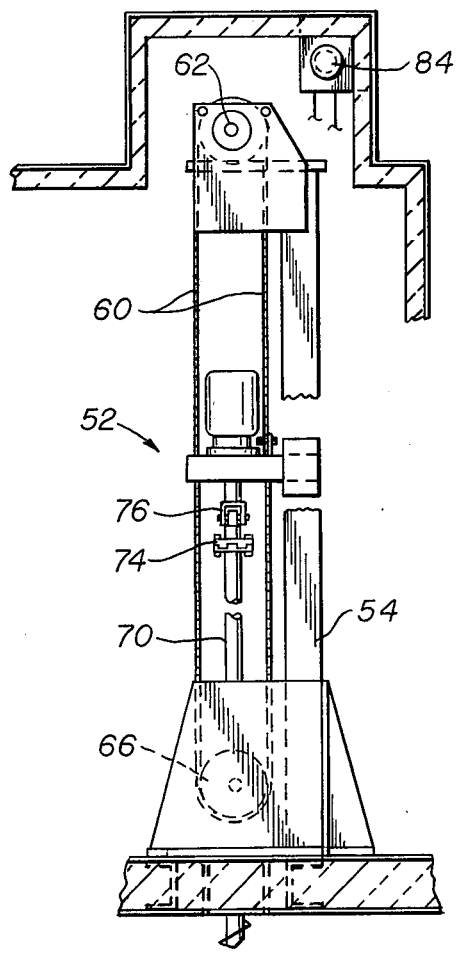
FIG. 5 is another view, partly in section and partly in elevation, of the drill and winch components of the invention of FIG. 4.

A means connected to housing H for boring holes in ice 12 is illustrated in FIGS. 4 and 5. Although many different kinds of boring apparatus are suitable for use with the invention, an auger drill 32 is used in the preferred embodiment. Drill 32 comprises a mast assembly 54 having two upright support members which are positively secured by welding or other suitable means to the floor of housing H. In the preferred embodiment, the mast extends upwardly from the floor to near the top of housing H. Mast 54 supports a traveling block 56 having guide members 58 which are adapted to slide vertically along mast 54. Traveling block 56 is confined between the support members of mast 54 to prevent any substantial horizontal movement of the traveling block.

A means for moving vertically said traveling block 56 within said mast 54 is provided to hoist said traveling block 56 to the upper end of said mast 54 and to pull down said traveling block 56 to the lower end of said mast 54. The moving means preferably comprises a pair of chains 60 attached to block 56 and driven by hydraulic motor 62. Each chain is connected at one end to the top of block 56, engages an upper sprocket wheel 64 and a lower sprocket wheel 66, and is connected at the other end to the bottom of block 56 so that the chain forms a closed loop. Thus, any movement of chains 60 around sprocket wheels 64 and 66 will either raise or lower traveling block 56. Both chains are moved in synchronization with each other since the upper sprocket wheels 64 are positively secured to a common shaft 68 which is driven by motor 62. Chains 60 preferably are attached to traveling block 56 symmetrically about the center of the block to prevent exerting a torque on said block.

Drill 32 includes a bit on shaft 70 which is rotatably driven by a hydraulic motor 72. The bit on shaft 70 is guided through hole 36 by a pipe 73. Motor 72 is positively secured to block 56 through a releasable securing means 74 and through U-joint 76. The auger shaft 70 is preferably of such a length that the end of the auger bit extends to just above the floor of housing H when the traveling block 56 is in the uppermost vertical position on mast 54. This arrangement allows auger 70 to pivot about U-joint 76 out of the vicinity of hole 36 in the floor of housing H so as not to interfere with other equipment lowered through hole 36. Releasable securing means 74 at the top of the shaft 70 is provided so that additional lengths of shaft may be added if the ice 12 is so thick that it cannot be pierced with a single length shaft. Releasable securing means 74 is preferably a pair of mating and interlocking hexagonal plates which are releasably fastened together by bolts or other means. The interlocking surfaces are preferred since in this manner the bolts holding the plates together are not exposed to shear forces during rotation of shaft 70.

Fluid motors 62 and 72 are provided with hydraulic fluid from hydraulic pump 42 through hoses 78 and 80, respectively, or other suitable connection means.

After a hole in ice 12 has been created by drill 32, auger shaft 70 is pivoted about U-joint 76 out of the vicinity of hole 36 in the floor of housing H. Next, it is desired to lower air gun 14 or other seismic equipment from within housing H through ice 12 and into water W.

A means for adjustably supporting an acoustic signal generating means such as air gun 34 from housing H is provided so that air gun 34 may be suspended from said housing at various depths in water W. In the preferred embodiment, the adjustable supporting means comprises a winch 82 which is driven by an electric motor 84. Winch 82 is secured by welding or other suitable means to the top of housing H by a pair of plates 86. On the shaft of winch 82 is wound a wire rope 88 which may be secured to air gun 14. Thus, air gun 14 may be lowered and raised vertically by operation of winch 82. Winch 82 is powered by alternator 48 or battery 50.

In the foregoing preferred embodiment of the invention, the components of the system are generally commercially available. Also, components having various sizes and operating specifications can be used without departing from the spirit and scope of applicants' invention. However, applicants believe that their invention can best be performed with certain components. For example, the invention is best performed using a high pressure air gun 14 such as the gun described in U.S. Pat. No. 3,638,752. Such a gun is operated at 4,000 to 7,000 pounds of pressure per square inch (p.s.i.). A high pressure gun is preferred over a low pressure gun since the system can be operated using lighter weight equipment which is an important factor in operating on ice-covered water. In addition, applicants believe the best mode of their invention will be carried out by using a Lister Type ST3 air-cooled diesel engine for engine 38, and an Ardco Model H15T4 air compressor for compressor 40. These and other components may be enclosed in a housing H which is 6 feet high, 6 feet long, and 5 feet wide. Clearly, however, a housing of other dimensions can be used according to the invention.

ALTERNATIVE EMBODIMENT

An alternative embodiment of the invention is schematically illustrated in FIGS. 6 and 7.

This embodiment differs from the first embodiment primarily in that housing H is divided into a plurality of sections, namely, a first section 90 and a second section 92. In this embodiment, the same equipment located in the housing H of FIGS. 1 through 5 is present but is divided among sections 90 and 92. In this embodiment, compressor 40, engine 38, and hydraulic pump 42 are located in first section 90 while the other equipment, namely fuel tank 44, hydraulic tank 46, battery 50, air gun 34, and drill 32, is located in second section 92.

The two sections are mounted on skids and are connected by suitable coupling means. The coupling means preferably includes a tow bar 94 pivotally connected to first section 90 which can be releasably fastened by suitable securing means on second section 92. The coupling means also includes an accordion conduit 96 through which fuel, hydraulic fluid, electrical cable, and warm air can pass between fuel section 90 and second section 92. The two sections of housing H are adapted to be separated by unfastening the bolts or other releasable securing means holding conduit 96 to the second section 92. Also, the lines 98 carrying fuel, hydraulic fluid and electrical energy between sections 90 and 92 are releasably coupled by suitable means 100.

The alternative embodiment has the advantage that the weight of the system is divided between two separable sections. Therefore, the two sections may be more easily transportable by helicopter of other air transportation means and, because the surface area of housing H contacting the ice is greater, this system may be supported by weaker ice than the preferred embodiment, assuming all other conditions are the same.

In operation, the housing H of either embodiment is transported by helicopter 10 or other means to a desired location for exploration. If the housing has been allowed to cool since its last previous use so that engine 38 in housing H is very cold, a suitable space heater powered by kerosine or other means is used temporarily to warm the components within housing H until engine 38 can be started. The heater is generally removed before operations commence to lower the weight of the unit. After housing H is suitably warm, it is transported to the first operating location for the work. Drill 32 then is used to bore a hole through the ice 12 and air gun 34 can be lowered through the hole into water W. The air gun is detonated and acoustic signals are sensed and recorded by standard geophysical equipment associated with shack 16. This procedure may be repeated with the air gun at different depths in water W or with the housing H and shack 16 moved to different locations. The air cooled engine 38 and the compressor 40 in housing H generate heat which provides a comfortable working environment for personnel within housing H and tends to prevent equipment within said housing from freezing.

Thus, it is evident from the foregoing that an air-transportable seismic exploration system for use on ice-covered water has been described which overcomes several disadvantages found in prior art systems.

While the invention has been particularly shown and described with reference to preferred and alternative embodiments thereof, it will be understood by those skilled in the art that various changes in size, shape, materials and in the details of this illustrated construction may be made within the scope of the appended claims without departing from the spirit of the invention.

We claim:

1. A seismic exploration apparatus for use on ice-covered water, comprising:
    a housing, said housing being substantially enclosed, said housing having a floor with a hole therein;
    means for generating acoustic signals; power means located within said housing for supplying power to said generating means, said power means also creating heat, whereby said heat warms the air within said housing, provides suitable working temperatures for personnel within said housing and prevents freezing of equipment within said housing; and
    means within said housing for boring holes in said ice so that said signal generating means can be lowered into the water below said ice.

2. The apparatus of claim 1 including means attached to said housing for connecting said housing to air transportation means, thereby allowing said housing to be transported by air from one location to another.

3. The apparatus of claim 2 wherein said means for generating acoustic signals includes a high-pressure air gun, said gun normally maintained within said housing when not in use in order to prevent said gun from freezing.

4. The apparatus of claim 3 including means attached to said housing for supporting said generating means in the water.

5. The apparatus of claim 4 including a compressor, said compressor located within said housing, said compressor connected to and driven by said power means, said compressor supplying compressed air to said gun.

6. The apparatus of claim 4 wherein said means for supporting said signal generating means comprises:
    a winch attached to said housing, said winch having wire rope attached to said generating means for lowering said generating means into the water through the hole in the floor of said housing and subsequently for hoisting said generating means back into said housing.

7. The apparatus of claim 2 wherein said means for boring comprises:
    an auger;
    a means attached to said housing for supporting said auger for vertical movement so that said auger can be lifted wholly within said housing or driven through the hole in the floor of said housing and through the ice below said housing; and
    means for rotating said auger.

8. The apparatus of claim 7 wherein said means for supporting said auger includes:
    a mast connected to said housing comprising two vertical support members;
    a traveling block slidably engaging said mast and adapted for vertical movement with respect to said mast, said traveling block supporting said means for rotating said auger; and means for moving vertically said traveling block along said support members.

9. The apparatus of claim 8 wherein said means for moving vertically said traveling block comprises:

an upper sprocket wheel connected to the upper end of said mast;

a lower sprocket wheel connected to the lower end of said mast;

a chain connected on one end to the upper surface of said traveling block and connected at the other end to the lower surface of said traveling block, said chain extending from the upper surface of said traveling block around and in positive engagement with said upper sprocket wheel, then extending around and in positive engagement with said lower sprocket wheel, and then to the lower surface of said traveling block; and means for driving said upper sprocket wheel so that the chain connected to said traveling block can hoist and pull down said traveling block and auger.

10. The apparatus of claim 9 wherein said housing is divided into a plurality of sections, each of said sections having releasable connecting means for attaching the section to air transportation means, each of said sections being releasably connected to other sections thereby providing a housing which can be transported in individual sections.

11. The apparatus of claim 10 including means for transporting hydraulic fluid, compressed air, electric current and warmed air between said plurality of sections.

12. A seismic exploration apparatus for use on ice-covered water, comprising:

a housing, said housing being substantially enclosed and having a floor containing a hole therein;

means connected to said housing for boring holes in the ice below said housing, said boring means extendable through the hole in the floor of said housing;

means for generating acoustic signals;

power means located within said housing for supplying power to said boring means and generating means and for generating heat within said housing without auxiliary heating apparatus; and means with said housing for supporting said signal generating means in the water through the hole in the floor of said housing and through the hole in said ice.

13. The apparatus of claim 12 including means for releasably connecting said housing to air transportation means so that said housing can be transported easily by air from one location to another.

14. The apparatus of claim 13 wherein said means for generating acoustic signals is a high pressure air gun.

15. The apparatus of claim 14 wherein said air gun operates at a pressure of at least 4,000 p.s.i.

16. The apparatus of claim 1 including insulation means on the inside of said housing, said insulation means, said power means, and the volume within said housing designed so that the temperatures within said housing are in the range 35° to 50° F when the temperatures outside said housing are in the range −35° to −60° F when said power means is operating.

17. The apparatus of claim 12 including insulation means on the inside of said housing, said insulation means, said power means, and the volume within said housing designed so that the temperatures within said housing are in the range 35° to 50° F when the temperatures outside said housing are in the range −35° to −60° F when said power means is operating.

18. A seismic exploration apparatus for use on ice-covered water, comprising:

a housing, said housing being substantially enclosed, said housing having a floor with a hole therein;

power means located within said housing for supplying power to said generating means, and power means also creating heat, whereby said heat warms the air within said housing, provides suitable working temperatures for personnel within said housing and prevents freezing of equipment within said housing;

means for generating acoustic signals, said means for generating acoustic signals including a high-pressure air gun, said gun normally maintained within said housing when not in use in order to prevent said gun from freezing;

means attached to said housing for connecting said housing to air transportation means, thereby allowing said housing to be transported by air from one location to another;

means attached to said housing for boring holes in said ice so that said signal generating means can be lowered into the water below said ice, said boring means including an auger; a means attached to said housing for supporting said auger for vertical movement so that said auger can be lifted wholly within said housing or driven through the hole in the floor of said housing, said supporting means including a mast connected to said housing comprising two vertical support members; a traveling block slidably engaging said mast and adapted for vertical movement with respect to said mast, said traveling block supporting said means for rotating said auger; and means for moving vertically said traveling block along said support members;

means within said housing for supporting said generating means in the water, said means comprising a winch within said housing, said winch having wire rope within said generating means for lowering said generating means into the water through the hole in the floor of said housing and subsequently for hoisting said generating means back into said housing; and a compressor, said compressor located within said housing, said compressor connected to and driven by said power means, said compressor supplying compressed air to said gun.

* * * * *